(12) United States Patent
Henne et al.

(10) Patent No.: US 11,583,149 B2
(45) Date of Patent: Feb. 21, 2023

(54) FASTENING ASSEMBLY FOR TOILET SEAT HINGE

(71) Applicant: Bemis Manufacturing Company, Sheboygan Falls, WI (US)

(72) Inventors: Brian A. Henne, Elkhart Lake, WI (US); Gérard Etaix, Fontaine (FR); Jonathan Arndt, Sheboygan, WI (US); Joseph M. Hand, Sheboygan Falls, WI (US)

(73) Assignee: Bemis Manufacturing Company, Sheboygan Falls, WI (US)

( * ) Notice: Subject to any disclaimer, the term of this patent is extended or adjusted under 35 U.S.C. 154(b) by 0 days.

(21) Appl. No.: 17/177,406

(22) Filed: Feb. 17, 2021

(65) Prior Publication Data

US 2021/0251441 A1 Aug. 19, 2021

Related U.S. Application Data

(60) Provisional application No. 62/978,113, filed on Feb. 18, 2020, provisional application No. 63/137,831, filed on Jan. 15, 2021.

(51) Int. Cl.
*A47K 13/12* (2006.01)

(52) U.S. Cl.
CPC .................... *A47K 13/12* (2013.01)

(58) Field of Classification Search
CPC .................................................. A47K 13/12

(Continued)

(56) References Cited

U.S. PATENT DOCUMENTS

| 1,959,620 A | 5/1934 | Eveno |
| 2,367,480 A | 1/1945 | Beswick |

(Continued)

FOREIGN PATENT DOCUMENTS

| DE | 202017001316 U1 | 7/2017 |
| EP | 0770186 B1 | 9/1998 |

(Continued)

OTHER PUBLICATIONS

Images of a speed nut for attaching a toilet seat to a toilet bowl, publicly available prior to Feb. 17, 2020.

(Continued)

*Primary Examiner* — Christine J Skubinna
(74) *Attorney, Agent, or Firm* — Michael Best & Friedrich LLP

(57) ABSTRACT

A fastening assembly is configured to couple a toilet seat hinge to a toilet bowl by a threaded shaft. The fastening assembly includes a fastening nut including a clamping portion having a resilient protrusion configured to allow axial movement of the fastening nut relative to the threaded shaft without rotation therebetween. The resilient protrusion has threads configured to engage the threaded shaft. The fastening nut includes a drive portion in which the clamping portion extends therefrom. The drive portion has a first segment coupled to a second segment by a shear segment. At least the first segment is configured to be engaged by a tool for the tool to rotate the fastening nut relative to the threaded shaft such that the shear segment fractures at a predetermined torque applied to the first segment relative to the second segment.

20 Claims, 14 Drawing Sheets

(58) Field of Classification Search
USPC .......................................................... 4/240
See application file for complete search history.

(56) References Cited

U.S. PATENT DOCUMENTS

| | | | |
|---|---|---|---|
| 2,690,201 A | 9/1954 | Fineran | |
| 3,254,363 A | 6/1966 | Watson | |
| 3,381,732 A | 5/1968 | Engelmann | |
| 3,570,021 A * | 3/1971 | Watson | A47K 13/26 |
| | | | 4/240 |
| 3,878,757 A | 4/1975 | Puklus, Jr. | |
| 4,378,187 A | 3/1983 | Fullerton | |
| 4,467,481 A | 8/1984 | Ginsburg | |
| 4,495,547 A | 1/1985 | Stoverock | |
| 4,618,300 A | 10/1986 | Goebel | |
| D294,219 S | 2/1988 | Hamatani | |
| 4,832,551 A | 5/1989 | Wollar | |
| 4,890,964 A | 1/1990 | Lindley et al. | |
| 5,118,237 A | 6/1992 | Wright | |
| 5,139,381 A | 8/1992 | Lubreski et al. | |
| 5,168,781 A | 12/1992 | Tenuta | |
| 5,292,217 A | 3/1994 | Korpi | |
| 5,320,466 A | 6/1994 | Suzuki | |
| 5,362,187 A | 11/1994 | Scalise | |
| 5,503,374 A | 4/1996 | Helion | |
| 5,511,919 A | 4/1996 | Scalise | |
| D415,016 S | 10/1999 | Murguia | |
| 5,992,272 A | 11/1999 | Fortner | |
| 6,089,807 A | 7/2000 | Larsson | |
| 6,974,291 B2 | 12/2005 | Li | |
| 7,165,482 B2 | 1/2007 | Shapoval | |
| 7,338,242 B2 | 3/2008 | Ellis et al. | |
| D627,039 S | 11/2010 | Yu | |
| D645,382 S | 9/2011 | Verbowski | |
| 8,231,318 B2 * | 7/2012 | Pitsch | E03C 1/0401 |
| | | | 411/270 |
| 8,540,471 B2 | 9/2013 | Dvorak | |
| 8,696,280 B2 | 4/2014 | Orange et al. | |
| D715,612 S | 10/2014 | Halstead | |
| 9,107,548 B2 | 8/2015 | Hand et al. | |
| 9,194,421 B2 | 11/2015 | Limatoc | |
| 9,222,245 B2 | 12/2015 | Ye et al. | |
| 9,316,245 B2 | 4/2016 | Dvorak | |
| 9,592,592 B2 | 3/2017 | Prunean | |
| 9,635,987 B2 * | 5/2017 | Hand | A47K 13/12 |
| D789,781 S | 6/2017 | Johnson | |
| D792,201 S | 7/2017 | Baiz et al. | |
| 9,986,878 B2 * | 6/2018 | Stelter | A47K 13/12 |
| 10,184,508 B2 | 1/2019 | Limatoc | |
| 10,300,588 B2 | 5/2019 | Pauba | |
| 10,323,679 B2 | 6/2019 | Limatoc | |
| 10,337,185 B2 | 7/2019 | Espinosa | |
| 10,537,982 B2 | 1/2020 | Prunean | |
| D874,245 S | 2/2020 | Whited et al. | |
| D890,604 S | 7/2020 | Kirkpatrick | |
| D905,546 S | 12/2020 | Liebelt | |
| D915,175 S | 4/2021 | Buckley et al. | |
| D923,467 S | 6/2021 | Buffalo | |
| D927,275 S | 8/2021 | Davis | |
| D931,718 S | 9/2021 | Edland | |
| D942,845 S | 2/2022 | Iacono | |
| 2005/0051596 A1 | 3/2005 | Estes | |
| 2006/0065693 A1 | 3/2006 | Eklund | |
| 2008/0008556 A1 * | 1/2008 | Dvorak | F16B 37/0821 |
| | | | 411/433 |
| 2008/0014049 A1 | 1/2008 | Dvorak | |
| 2012/0210546 A1 | 8/2012 | Jang | |
| 2012/0230796 A1 | 9/2012 | McClure | |
| 2014/0186134 A1 | 7/2014 | Lin | |
| 2015/0273463 A1 | 10/2015 | Motadel | |
| 2016/0363156 A1 | 12/2016 | Yonker et al. | |
| 2017/0036329 A1 | 2/2017 | Santamarina et al. | |
| 2018/0263438 A1 | 9/2018 | Verchick | |
| 2019/0000285 A1 * | 1/2019 | Xu | E05D 7/12 |
| 2019/0078607 A1 | 3/2019 | Quinn et al. | |
| 2019/0208969 A1 | 7/2019 | Laundre | |
| 2019/0316626 A1 | 10/2019 | Limatoc | |
| 2020/0141440 A1 | 5/2020 | Liebelt et al. | |
| 2020/0217345 A1 | 7/2020 | Liebelt | |
| 2020/0246152 A1 | 8/2020 | Marlow | |
| 2020/0249407 A1 | 8/2020 | Aznag et al. | |
| 2021/0251441 A1 | 8/2021 | Henne et al. | |
| 2021/0259485 A1 | 8/2021 | Garcia | |

FOREIGN PATENT DOCUMENTS

| | | |
|---|---|---|
| WO | 8801024 A1 | 2/1988 |
| WO | 2007024144 A1 | 3/2007 |
| WO | 2014087131 A1 | 6/2014 |

OTHER PUBLICATIONS

Kohler, "Install a Toilet Seat with Quick Attach Hardware," <https://support.kohler.com/hc/en-us/articles/360001922614-Install-a-Toilet-Seat-with-Quick-Attach-Hardware> webpage publicly available prior to Feb. 17, 2020.

Extended European Search Report for Application No. 21157825.7 dated Sep. 7, 2021 (9 pages).

* cited by examiner

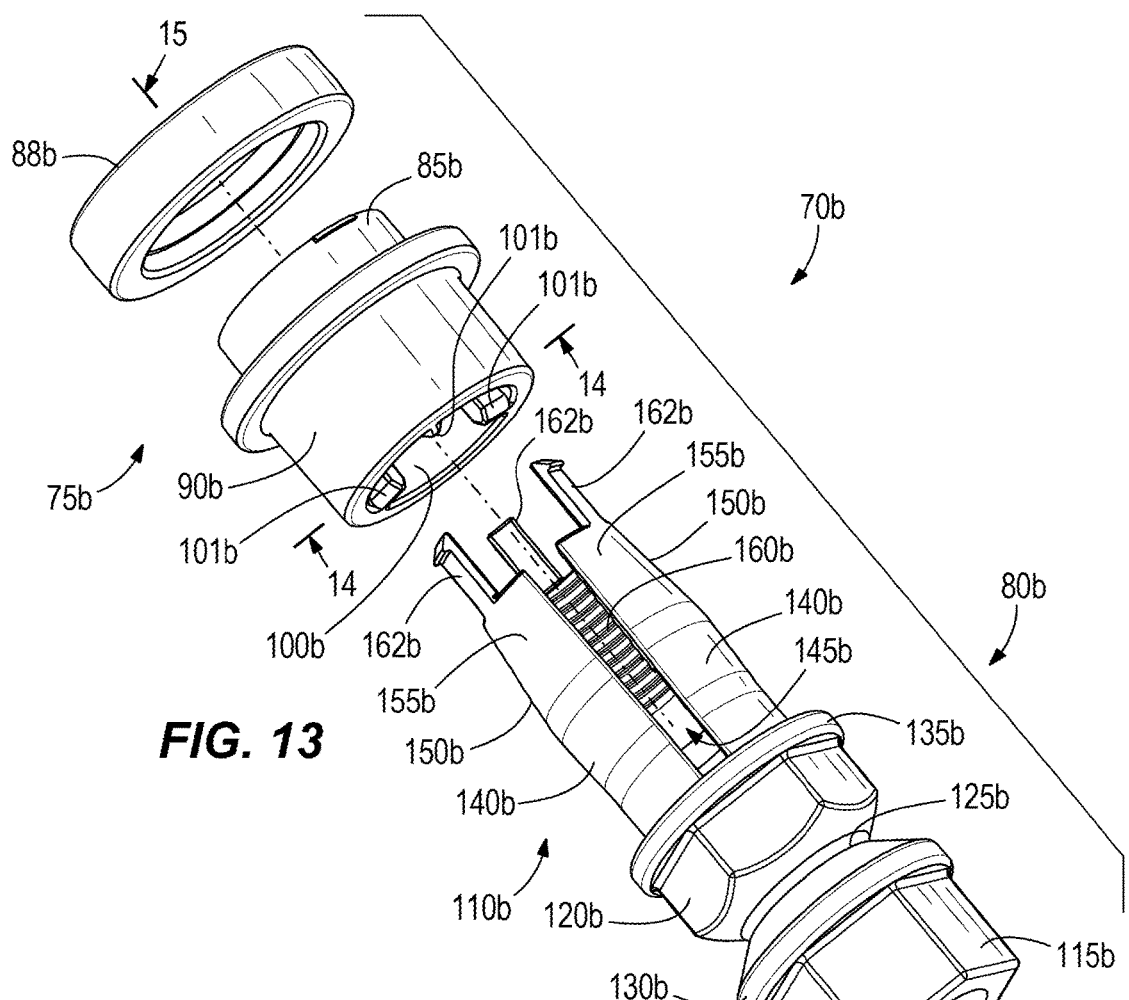
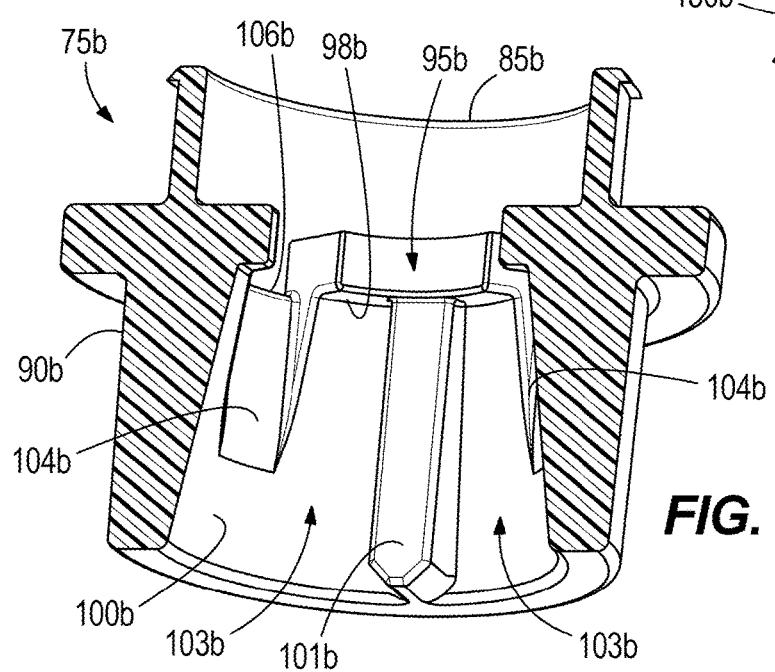
FIG. 13
FIG. 14

FASTENING ASSEMBLY FOR TOILET SEAT HINGE

CROSS-REFERENCE TO RELATED APPLICATIONS

This application claims benefit of U.S. Provisional Patent Application No. 62/978,113 filed Feb. 18, 2020 and U.S. Provisional Patent Application No. 63/137,831 filed Jan. 15, 2021, the contents of both of which are incorporated herein by reference.

FIELD OF THE DISCLOSURE

The present disclosure relates to a toilet seat hinge for mounting a toilet seat to a toilet bowl, and more particularly to a fastening assembly that couples the toilet seat hinge to the toilet bowl.

SUMMARY

In one aspect, a fastening assembly is configured to couple a toilet seat hinge to a toilet bowl by a threaded shaft. The fastening assembly includes a sleeve configured to abut a portion of the toilet bowl. The sleeve includes an inner surface defining an aperture. The aperture is configured to receive the threaded shaft. The fastening assembly includes a fastening nut including a clamping portion having a resilient protrusion configured to allow axial movement of the fastening nut relative to the threaded shaft without rotation therebetween. The resilient protrusion has an outer surface engageable with the inner surface of the sleeve. The resilient protrusion has threads configured to engage the threaded shaft. The fastening nut includes a drive portion in which the clamping portion extends therefrom. The drive portion has a first segment coupled to a second segment by a shear segment. At least the first segment is configured to be engaged by a tool for the tool to rotate the fastening nut relative to the threaded shaft such that the shear segment fractures at a predetermined torque applied to the first segment relative to the second segment.

In another aspect, a fastening assembly is configured to couple a toilet seat hinge to a toilet bowl by a threaded shaft. The fastening assembly includes a fastening nut including a clamping portion having a resilient protrusion configured to allow axial movement of the fastening nut relative to the threaded shaft without rotation therebetween. The resilient protrusion has threads configured to engage the threaded shaft. The fastening nut includes a drive portion in which the clamping portion extends therefrom. The drive portion has a first segment coupled to a second segment by a shear segment. At least the first segment is configured to be engaged by a tool for the tool to rotate the fastening nut relative to the threaded shaft such that the shear segment fractures at a predetermined torque applied to the first segment relative to the second segment.

In yet another aspect, a fastening assembly is configured to couple a toilet seat hinge to a toilet bowl by a threaded shaft. The fastening assembly includes a sleeve including an inner surface defining an aperture. The aperture is configured to receive the threaded shaft such that the sleeve is axially moveable along the threaded shaft to abut a portion of the toilet bowl. The fastening assembly includes a fastening nut including a resilient clamping portion and a drive portion. The fastening nut is configured to receive the threaded shaft such that the fastening nut is axially moveable along the threaded shaft without rotation between the fastening nut and the threaded shaft. The resilient clamping portion is configured to engage the threaded shaft and the inner surface of the sleeve such that rotation of the fastening nut relative to the threaded shaft axially moves the fastening nut relative to the sleeve. The drive portion is configured to fracture at a predetermined torque during rotation of the fastening nut relative to the threaded shaft.

Other aspects of the disclosure will become apparent by consideration of the detailed description and accompanying drawings.

BRIEF DESCRIPTION OF THE DRAWINGS

FIG. 13 is an exploded view of a fastening assembly according to another embodiment of the disclosure.

FIG. 14 is a cross sectional view of a sleeve of the fastening assembly of FIG. 13 taken along line 14-14.

DETAILED DESCRIPTION

Before any embodiments of the disclosure are explained in detail, it is to be understood that the disclosure is not limited in its application to the details of construction and the arrangement of components set forth in the following description or illustrated in the following drawings. The disclosure is capable of supporting other embodiments and being practiced or being carried out in various ways. Also, it is to be understood that the phraseology and terminology used herein is for the purpose of description and should not be regarded as limiting. Terms of degree, such as "substantially," "about," "approximately," etc. are understood by those of ordinary skill to refer to reasonable ranges outside of the given value, for example, general tolerances associated with manufacturing, assembly, and use of the described embodiments.

Figure 1:
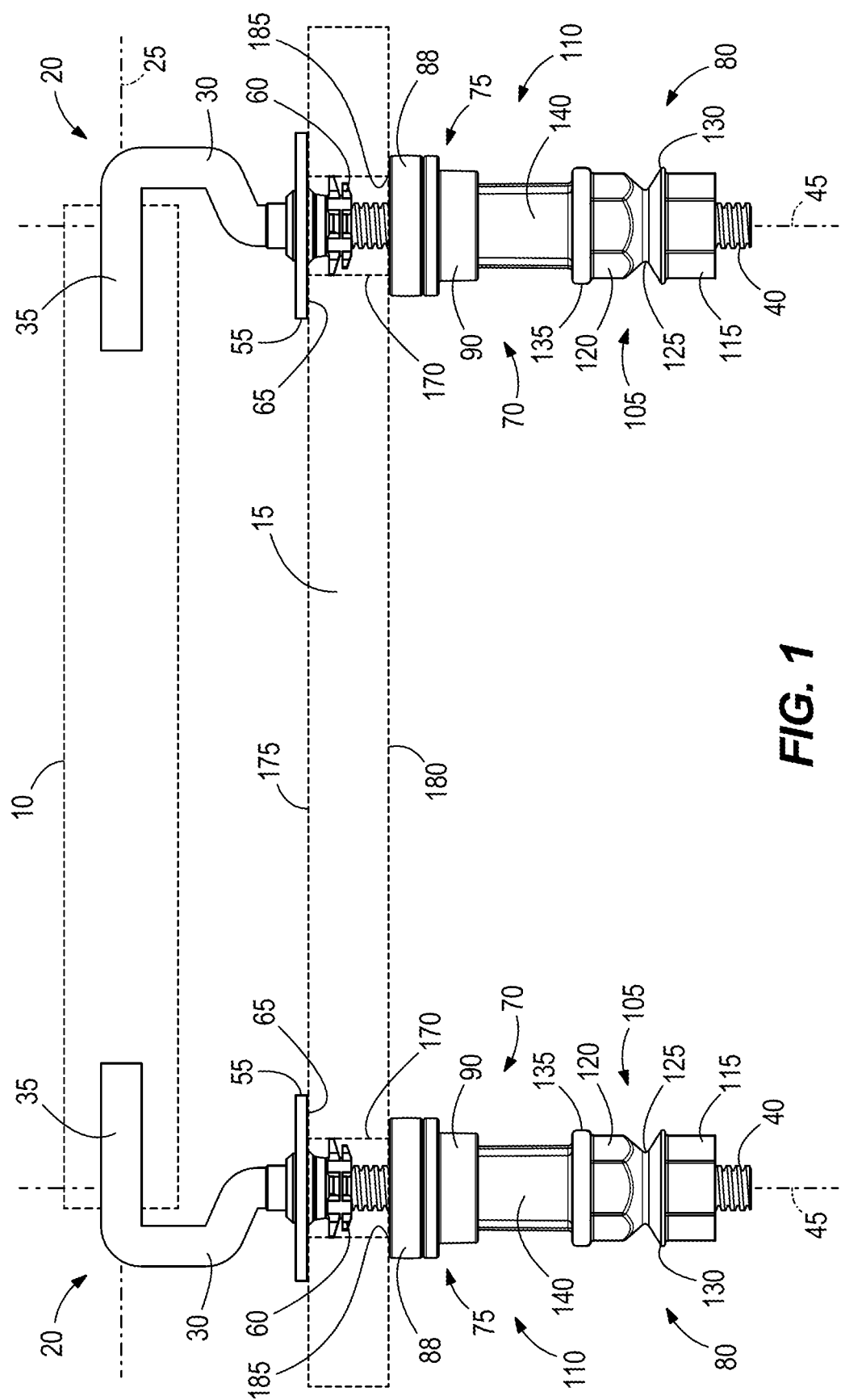
FIG. 1 illustrates toilet seat hinges coupling a toilet seat to a toilet bowl.

FIG. 1 illustrates a toilet seat 10 coupled to a toilet bowl 15 by toilet seat hinges 20. The toilet seat hinges 20 enable the toilet seat 10 to pivot about an axis 25 between an upright position and a lowered, in-use position relative to the toilet bowl 15. In other embodiments, the toilet seat hinges 20 can also support a toilet lid about the axis 25. In further embodiments, just one toilet seat hinge 20 can couple the toilet seat 10 to the toilet bowl 15.

Figure 2:
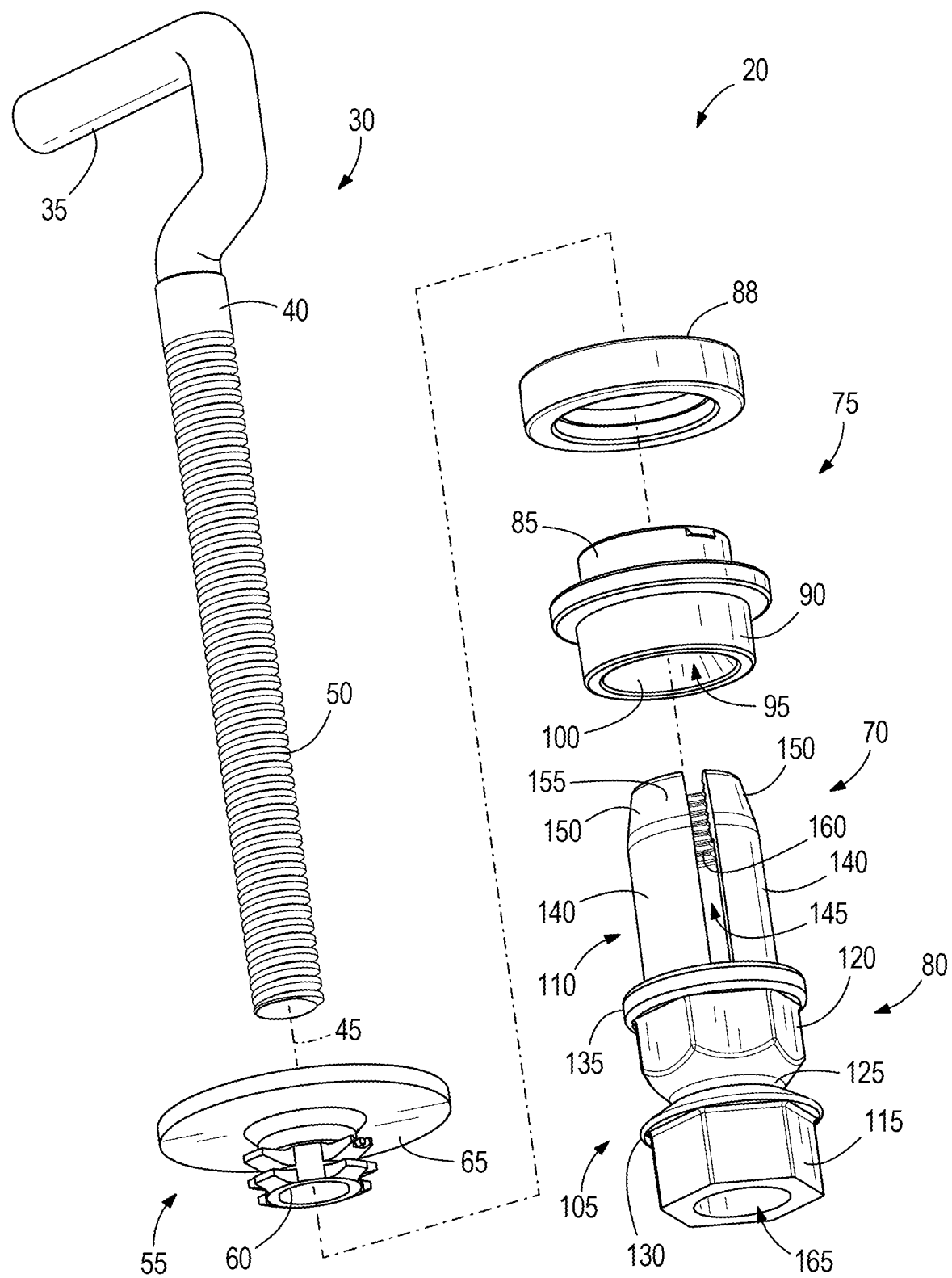
FIG. 2 is an exploded view of one toilet seat hinge of FIG. 1 including a fastening assembly according to an embodiment of the disclosure.
Figure 3:
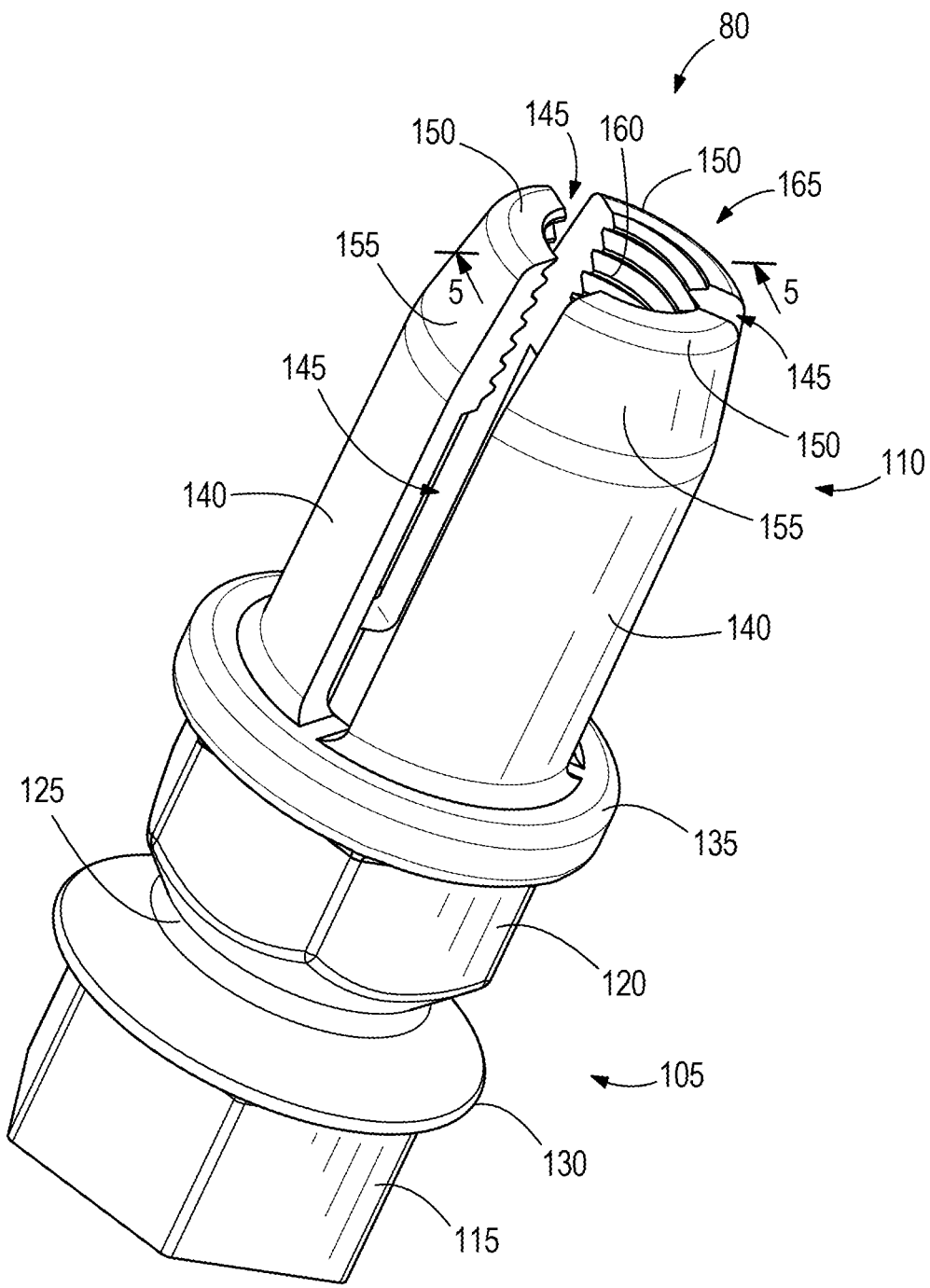
FIG. 3 is a first perspective view of a fastening nut of the fastening assembly of FIG. 2.
Figure 4:
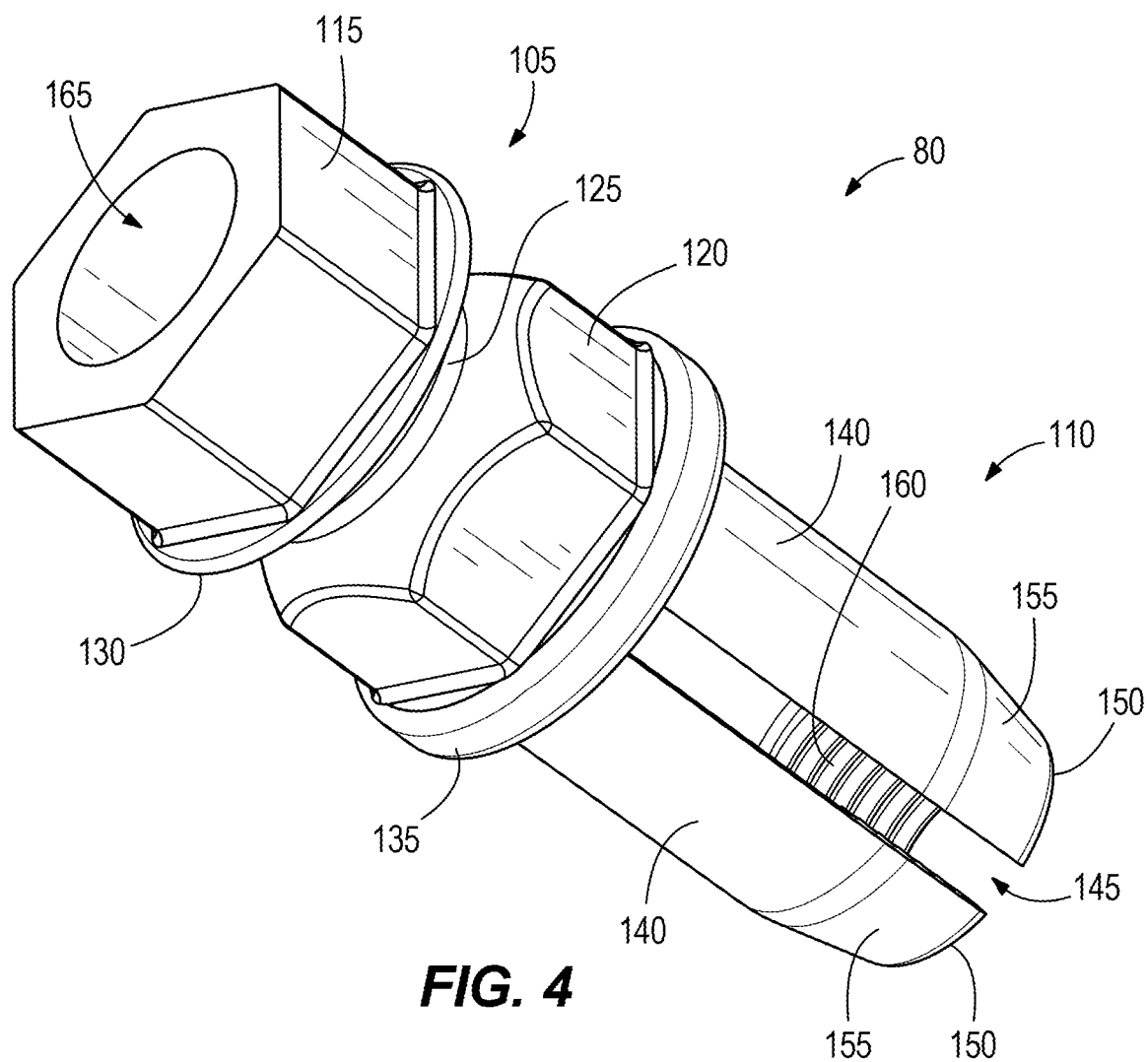
FIG. 4 is a second perspective view of the fastening nut of FIG. 2.

Both toilet seat hinges 20 are substantially similar, and as such, only one of the toilet seat hinges 20 will be discussed in detail below. With reference to FIG. 2, the illustrated toilet seat hinge 20 includes a hinge post 30 having an attachment portion 35 that is coupled to the toilet seat 10 enabling the toilet seat 10 to pivot about the axis 25. The hinge post 30 also includes a shaft 40 defining a longitudinal axis 45. The shaft 40 includes exterior threads 50 at least partially extending along the length of the shaft 40. In addition, the toilet seat hinge 20 includes an upper washer 55 coupled to a deformable bushing 60. The deformable bushing 60 extends from a lower surface 65 of the upper washer 55. The upper washer 55 includes a central aperture sized to receive the shaft 40 of the hinge post 30. In the illustrated embodiment, the hinge post 30 and the upper washer 55 are manufactured from a metallic material and the deformable bushing 60 is manufactured from a plastic material. In other embodiments, the hinge post 30, the upper washer 55, and the deformable bushing 60 can be manufactured from different materials (e.g., the hinge post 30 can be manufactured from a plastic material, etc.).

In the illustrated embodiment, the hinge post 30 is designed for use in a commercial-type bathroom (e.g., business buildings, etc.). In other embodiments, the hinge post 30 can be a mounting post designed for use in a residential-type bathroom (e.g., houses, etc.). The hinge post 30 can be secured to the toilet bowl 15 (e.g., with a fastening assembly described below) enabling a quick-disconnect hinge post to be selectively coupled to the mounting post. The quick-disconnect hinge post supports the toilet seat 10 about the axis 25. For example, U.S. Pat. No. 9,986,878—the contents of which are incorporated herein by reference—discloses a quick-disconnect hinge post design that can couple the toilet seat 10 to the toilet bowl 15.

Figure 7:
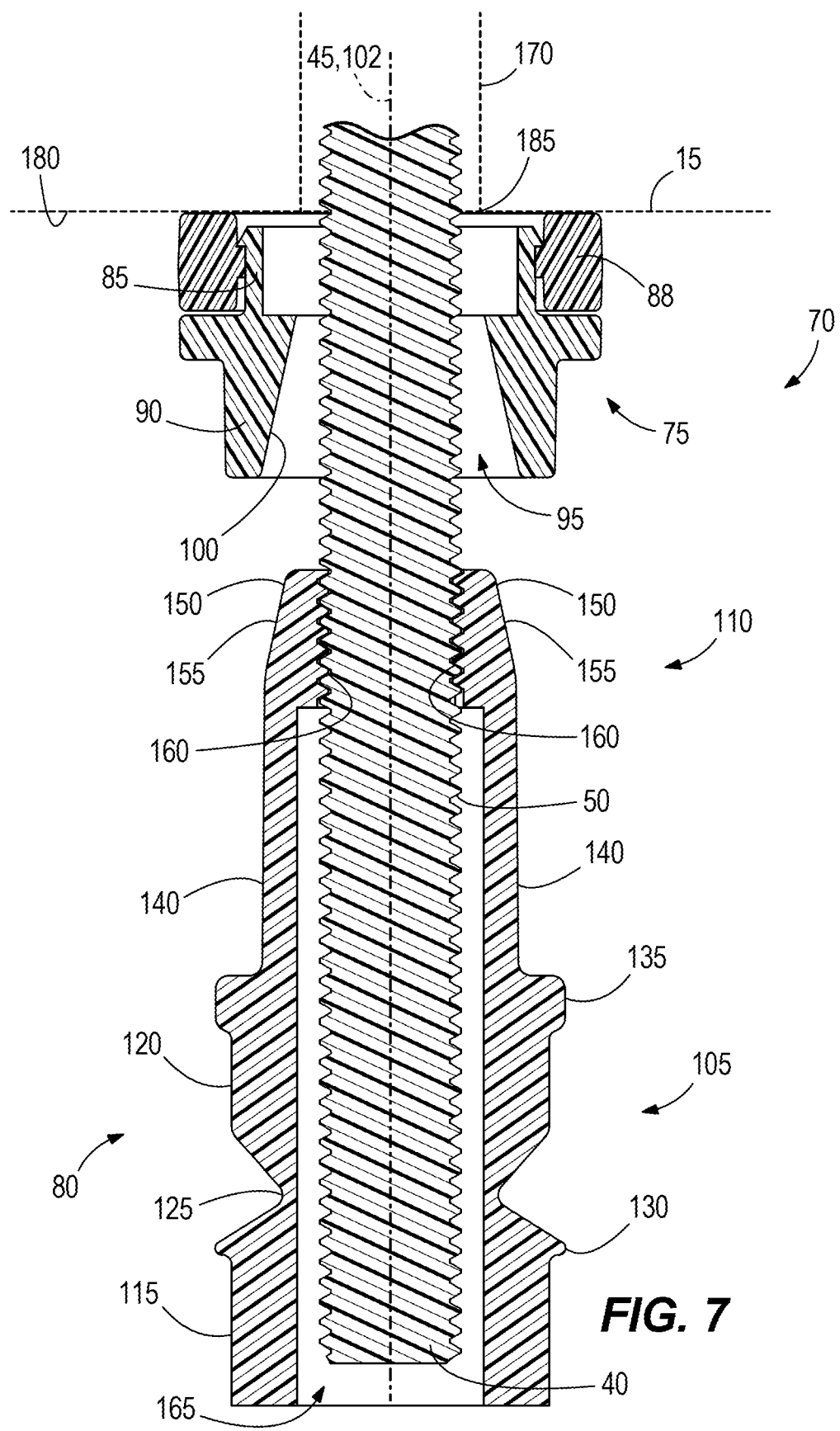
FIG. 7 is a cross sectional view of one fastening assembly of FIG. 6.
Figure 8:
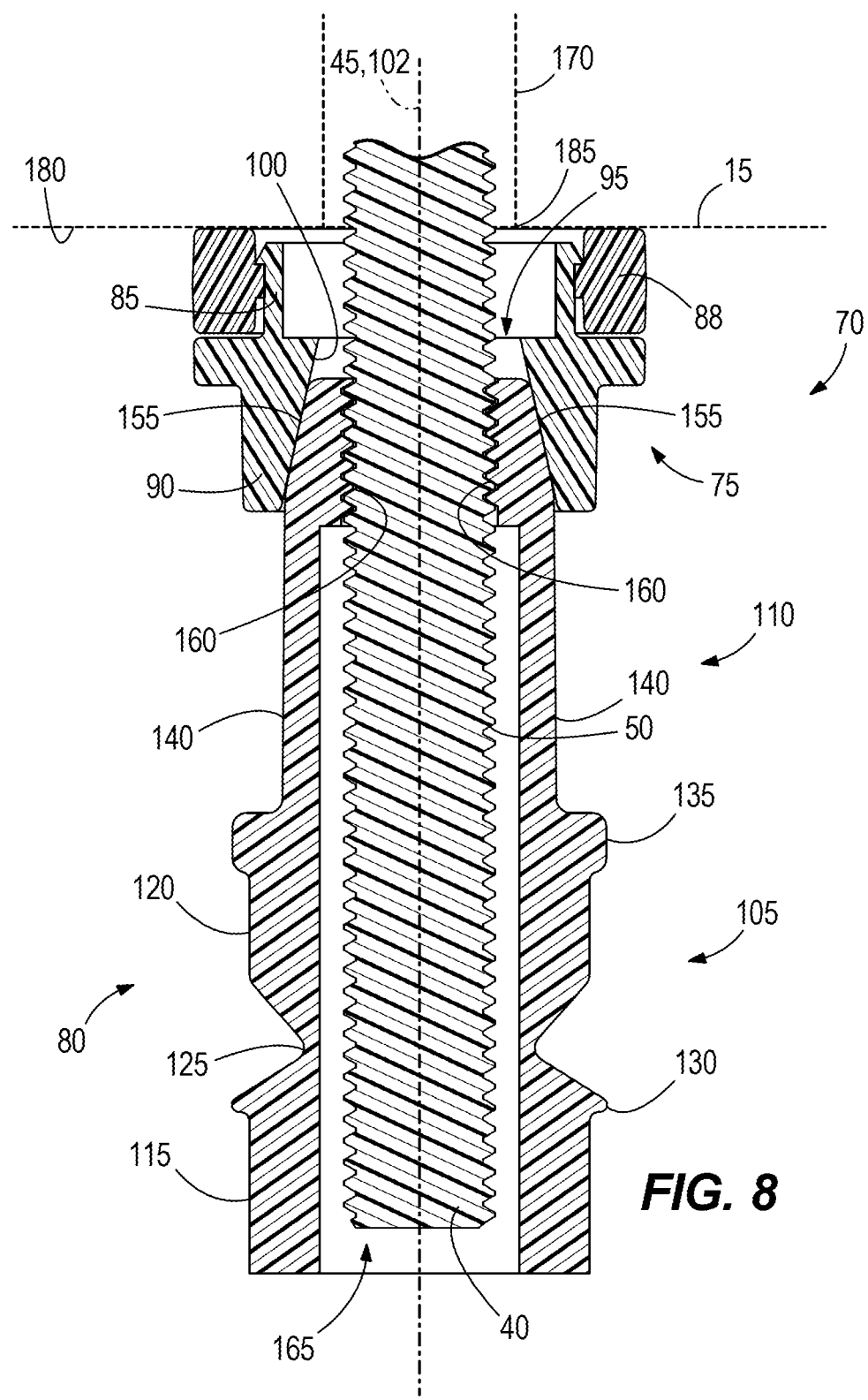
FIG. 8 is a cross sectional view of one fastening assembly of FIG. 1.

With continued reference to FIG. 2, the toilet seat hinge 20 includes a fastening assembly 70 that is operable to secure the hinge post 30—and ultimately the toilet seat 10—to the toilet bowl 15. The fastening assembly 70 includes a sleeve 75 (e.g., lower washer) and a quick-fastening nut 80. The sleeve 75 includes a stem 85, a thrust bushing 88 rotatably coupled to the stem 85, a lower portion 90 opposite the stem 85, and a central aperture 95 extending between the stem 85 and the lower portion 90 (FIG. 7). In particular, the sleeve 75 includes an inner frustoconical-shaped wedge surface 100 defining the central aperture 95. In some embodiments, the inner wedge surface 100 defines a portion of the central aperture 95, for example, a portion of the central aperture 95 adjacent the lower portion 90 and the remaining portion of the central aperture 95 is a constant diameter aperture. In the illustrated embodiment, the sleeve 75 and the nut 80 are manufactured from a plastic material. In other embodiments, the sleeve 75 and the nut 80 can be manufactured from other materials. In further embodiments, the stem 85 and the thrust bushing 88 can be omitted from the sleeve 75. In other embodiments, the surface 100 can be shaped differently (e.g., the inner surface 100 can be substantially cylindrical).

Figure 5:
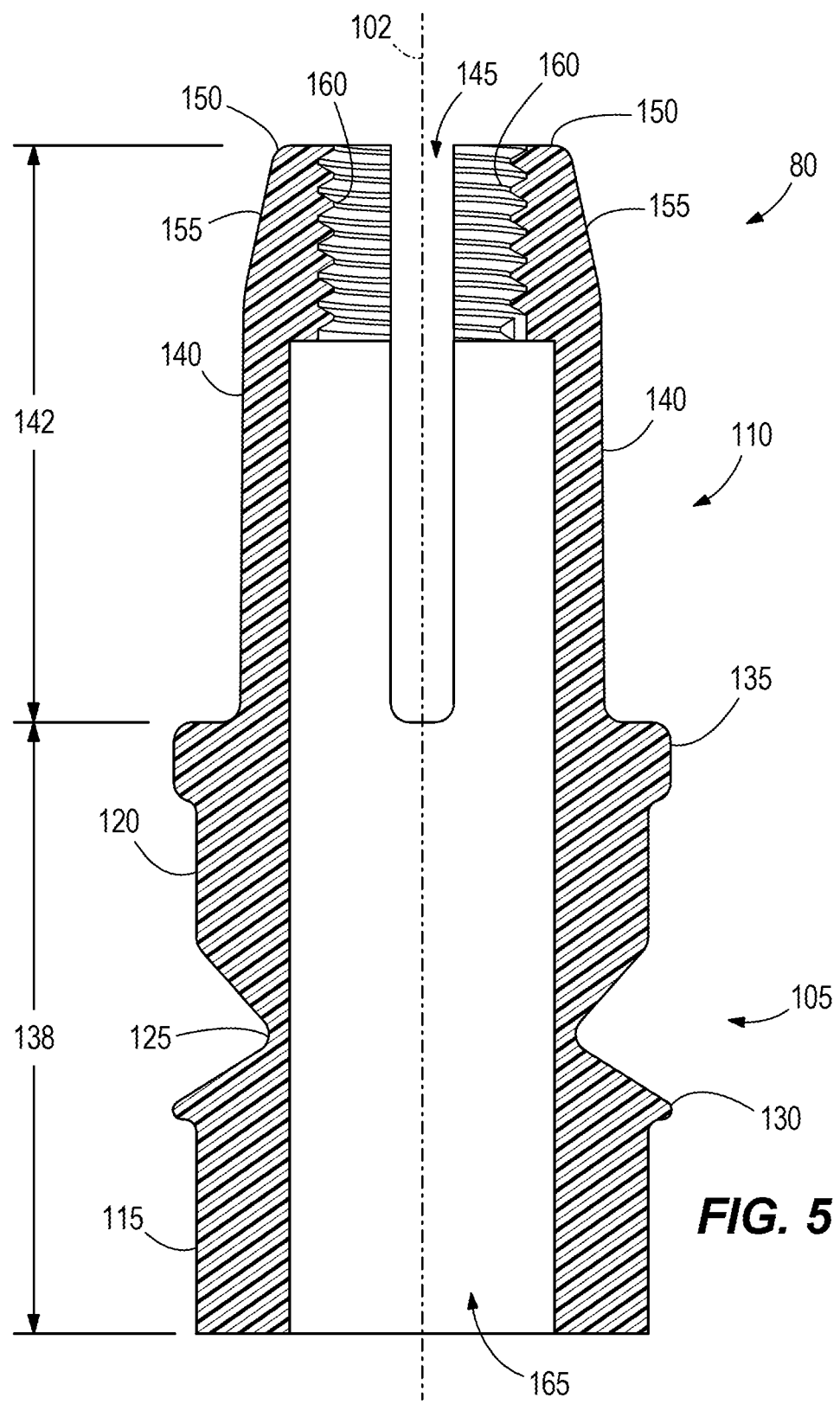
FIG. 5 is a cross sectional view of the fastening nut taken along line 5-5 of FIG. 3.

With reference to FIGS. 2-5, the fastening nut 80 is a single-piece shear nut defining a longitudinal axis 102 and including a drive portion 105 (e.g., a base) and a clamping portion 110. The fastening nut 80 may be, for example, a plastic injection molded component. The illustrated drive portion 105 includes a first segment 115, a second segment 120, and a shear segment 125 coupled between the first and second segments 115, 120. The first and second segments 115, 120 are sized to be engaged/gripped by a tool (e.g., a wrench or the like) for the tool to rotate the fastening nut 80. The first segment 115 includes a first annular ledge 130 (e.g., a first stop) that abuts the tool when the tool engages the first segment 115 to inhibit the tool from sliding off the first segment 115 toward the second segment 120. Likewise, the second segment 120 includes a second annular ledge 135 (e.g., a second stop) that abuts the tool when the tool engages the second segment 120 to inhibit the tool from sliding off the second segment 120 toward the clamping portion 110. With reference to FIG. 5, the illustrated drive portion 105 includes a maximum length 138 measured along the longitudinal axis 102 of the nut 80 between a bottom end of the first segment 115 and a top end of the second annular ledge 135. In the illustrated embodiment, the first segment 115 and the second segment 120 include a similar profile/geometry such that a single tool (e.g., a ½" wrench, etc.) can engage the first segment 115 and the second segment 120 to rotate the fastening nut 80. In other embodiments, the first segment 115 and the second segment 120 can include a different size, profile, etc. As best shown in FIG. 5, the shear segment 125 includes a smaller wall thickness than the first and second segments 115, 120 enabling the shear segment 125 to fracture at a predetermined torque when the first segment 115 is rotated relative to the second segment 120—discussed in more detail below.

With continued reference to FIGS. 2-5, the clamping portion 110 includes resilient protrusions 140 (e.g., resilient fingers) extending from the second annular ledge 135 of the drive portion 105. For example, the protrusions 140 are cantilevered from the second annular ledge 135. The illustrated clamping portion 110 includes a maximum length 142 measured along the longitudinal axis 102 of the nut 80 between the top end of the second annular ledge 135 and a top end of the protrusions 140. In the illustrated embodiment, the maximum length 142 of the clamping portion 110 is less than the maximum length 138 of the gripping portion 105. In other embodiments, the maximum length 142 can be substantially equal to the maximum length 138, or the maximum length 142 can be greater than the maximum length 138. In the illustrated embodiment, the clamping portion 110 includes three resilient protrusions 140 with adjacent protrusions 140 separated by a slot 145. In addition, each protrusion 140 includes a head 150 (e.g., end portion) having an outer wedge surface 155 and inner threads 160. The inner threads 160 of the protrusions 140 are sized to interface with the exterior threads 50 of the shaft 40. The illustrated slots 145 are open adjacent the heads 150 of the protrusions 140 enabling the protrusions 140 to flex radially inward relative to each other. Moreover, the protrusions 140 include a predetermined hardness or stiffness. As such, the flexibility of the protrusions 140 relative to the drive portion 105 can vary dependent upon the hardness of the protrusions 140 and the maximum length 142 of the clamping portion 110. For example, the flexibility of the protrusions 140 decrease when the maximum length 142 decreases, and the flexibility of the protrusions 140 also decrease when the hardness of the protrusions 140 increase. In other embodiments, the clamping portion 110 can include one protrusion, two protrusions, four protrusions, five protrusions, etc.

As best shown in FIG. 5, the fastening nut 80 also includes a central bore 165 extending through the drive portion 105 and the clamping portion 110. The illustrated central bore 165 includes a smooth bore portion extending entirely through the drive portion 105 and partially extending through the clamping portion 110. Specifically, inner surfaces of the protrusions 140 partially define the smooth bore portion of the central bore 165. The central bore 165 is also defined by the inner threads 160 of the protrusions 140. In other embodiments, the central bore 165 may not extend completely through the drive portion 105 and/or the clamping portion 110 (e.g., the central bore 165 can terminate within the drive portion 105).

Figure 6:
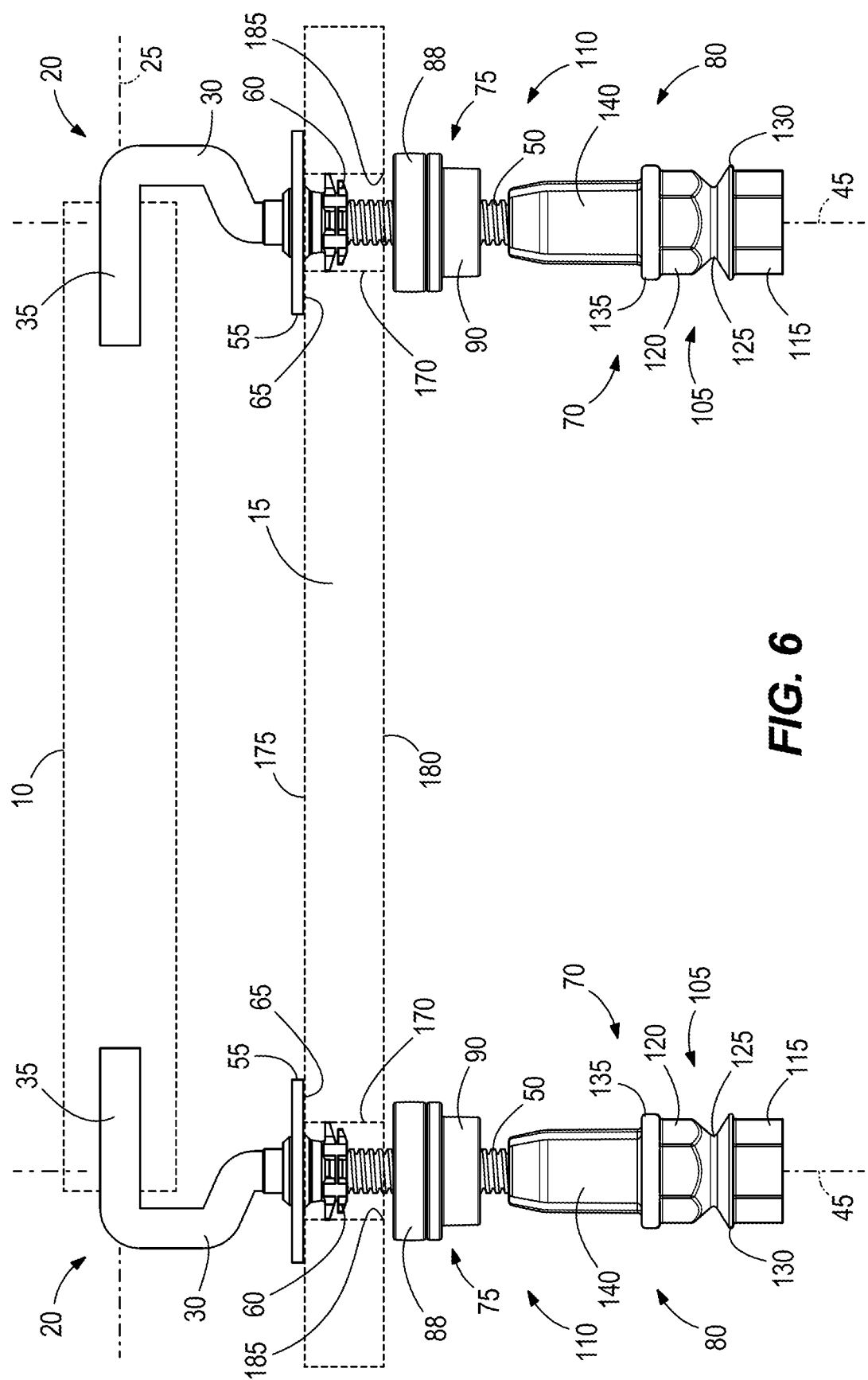
FIG. 6 illustrates an intermediate state of coupling the toilet seat hinges of FIG. 1 to the toilet bowl.

With reference to FIG. 6, the toilet seat hinges 20 are illustrated in an intermediate state of being assembled to the toilet bowl 15. During assembly, the shafts 40 of the hinge posts 30 are inserted into corresponding openings 170 in the toilet bowl 15 for the lower surfaces 65 of the upper washers 55 to abut a top surface 175 of the toilet bowl 15. In addition, the deformable bushings 60 are received within and deform to the size of the openings 170 to restrict lateral movement of the shafts 40 within the openings 170. Accordingly, the hinge posts 30 can be installed on different toilet bowls having different sized openings 170, but yet still restrict lateral movement of the shafts 40 by the bushings 60 deforming to the size of the openings 170.

With continued reference to FIG. 6, the sleeves 75 are slid over the corresponding shafts 40 such that the thrust bushings 88 abut a bottom surface 180 of the toilet bowl 15. The fastening nuts 80 are then slid over the corresponding shafts 40 toward the respective sleeve 75 (e.g., the shafts 40 are received within the central bores 165 of the nuts 80). With reference to FIG. 7, each fastening nut 80 linearly moves (without rotation) along the longitudinal axis 45 of their respective shaft 40 for quick movement toward their respective sleeve 75. In particular, the inner threads 160 of each protrusion 140 are biased into engagement with the exterior threads 50 of the corresponding shaft 40 such that the inner threads 160 can axially slide over the exterior threads 50 (FIG. 7). In other embodiments, the protrusions 140 of each fastening nut 80 are spaced relative to each other such that the inner threads 160 of the protrusions 140 do not engage or partially engage the exterior threads 50 of the shafts 40 as the fastening nut 80 is slid toward the sleeve 75. In addition, the smooth bore portion of the central bores 165 are sized to not engage the corresponding shaft 40 as to not impede linear movement of the nuts 80 along the shafts 40. Accordingly, the nuts 80 can be quickly assembled onto the shafts 40 by linearly sliding the nuts 80 along the shafts 40 before the nuts 80 engage the respective sleeve 75.

With continued movement of each nut 80 along the shaft 40, the outer wedge surfaces 155 of the protrusions 140 engage the corresponding inner wedge surface 100 of the sleeve 75. Engagement between the protrusions 140 and the wedge surface 100 inhibits the protrusions 140 from flexing outwardly. As such, the nut 80 is then rotated to tighten the nut 80 on the shaft 40 causing the outer wedge surfaces 155 to slide along the inner wedge surface 100 to clamp the heads 155 between the shaft 40 and the sleeve 75. In some embodiments, the engagement between the nut 80 and the sleeve 75 causes the nut 80 and the sleeve 75 to rotate relative to the thrust bushing 88. Accordingly, the thrust bushing 88 provides a low-friction member between the sleeve 75 and the toilet bowl 15 to reduce wear on the sleeve 75 (e.g., by spacing the sleeve 75 away from the toilet bowl 15).

In other embodiments, the sleeves 75 can be omitted such that the outer wedge surfaces 155 of the protrusions 140 engage edges 185 (FIGS. 1 and 6) of the bottom surface 180 of the toilet bowl 15. The engagement between the edges 185 and the protrusions 140 enable the protrusions 140 to flex radially inward to engage the corresponding shaft 40.

To then tighten each nut 80 to the predetermined torque of the drive portion 105, the tool engages the first segment 115 to rotate the nut 80 relative to the corresponding shaft 40 until the torque increases to a state where the shear segment 125 deforms. The deformation of the shear segment 125 also allows the first segment 115 to rotate relative to the second segment 120 until the predetermined torque is reached and the shear segment 125 fractures (e.g., the first segment 115 breaks off from the second segment 120). Accordingly, the toilet seat hinges 20 are fastened to the toilet bowl 15 at the predetermined torque of the shear nuts 80. Moreover, the relationship between the hardness of the protrusions 140 and the maximum length 142 of the clamping portion 110 provides maximum radial gripping forces on the hinge posts 30 relative to the predetermined torque of the drive portion 105. For example, the flexibility of the protrusions 140 (dependent upon the hardness and the maximum length 142) is such that the predetermined torque applied to the drive portion 105 is sufficient to bias the protrusions 140 into engagement with the hinge posts 30 at a predetermined clamping force. If the stiffness of the protrusions 140 is too great, the predetermined torque of the drive portion 105 will not be sufficient to bias the protrusions 140 into the predetermined clamping engagement with the hinge posts 30. If the stiffness of the protrusions 140 is too small, the predetermined clamping engagement with the hinge post 30 may not be reached before the first segment 115 shears off.

The toilet seat hinges 20 can also be completely removed from the toilet bowl 15, for example, to replace the toilet seat 10. In particular, the tool engages the second segment 120 to rotate the nut 80 in a loosening direction. In one embodiment, the sleeve 75 is held stationary relative to the toilet bowl 15 (e.g., holding the thrust bushing 88 against the bottom surface 180), and the nut 80 is rotated to move away from the toilet bowl 15. In particular, the outer wedge surfaces 155 rotatably slide along the inner wedge surface 100 of the sleeve 75 for the resiliency of the protrusions 140 to move the inner threads 160 radially outward. The clamping force of the nut 80 on the shaft 40 will decrease to a point where the inner threads 160 can axially slide over the exterior threads 50 of the shafts 40 (e.g., when the nut 80 is spaced from the sleeve 75). Thereafter, the nuts 80 can linearly slide off the hinge posts 30, and the toilet seat 10 can be replaced. In other embodiments, the sleeve 75 and the nut 80 can be rotated together along the shaft 40 to remove the fastening assembly 70 from the shaft 40.

FIGS. 9-12 illustrate a fastening assembly 70a according to another embodiment. The fastening assembly 70a is similar to the fastening assembly 70; therefore, similar components are designated with similar references numbers each identified by an "a." At least some differences and/or at least some similarities between the fastening assemblies 70, 70a will be discussed in detail below. In addition, components or features described with respect to only one or some of the embodiments described herein are equally applicable to any other embodiments described herein.

Figure 9:
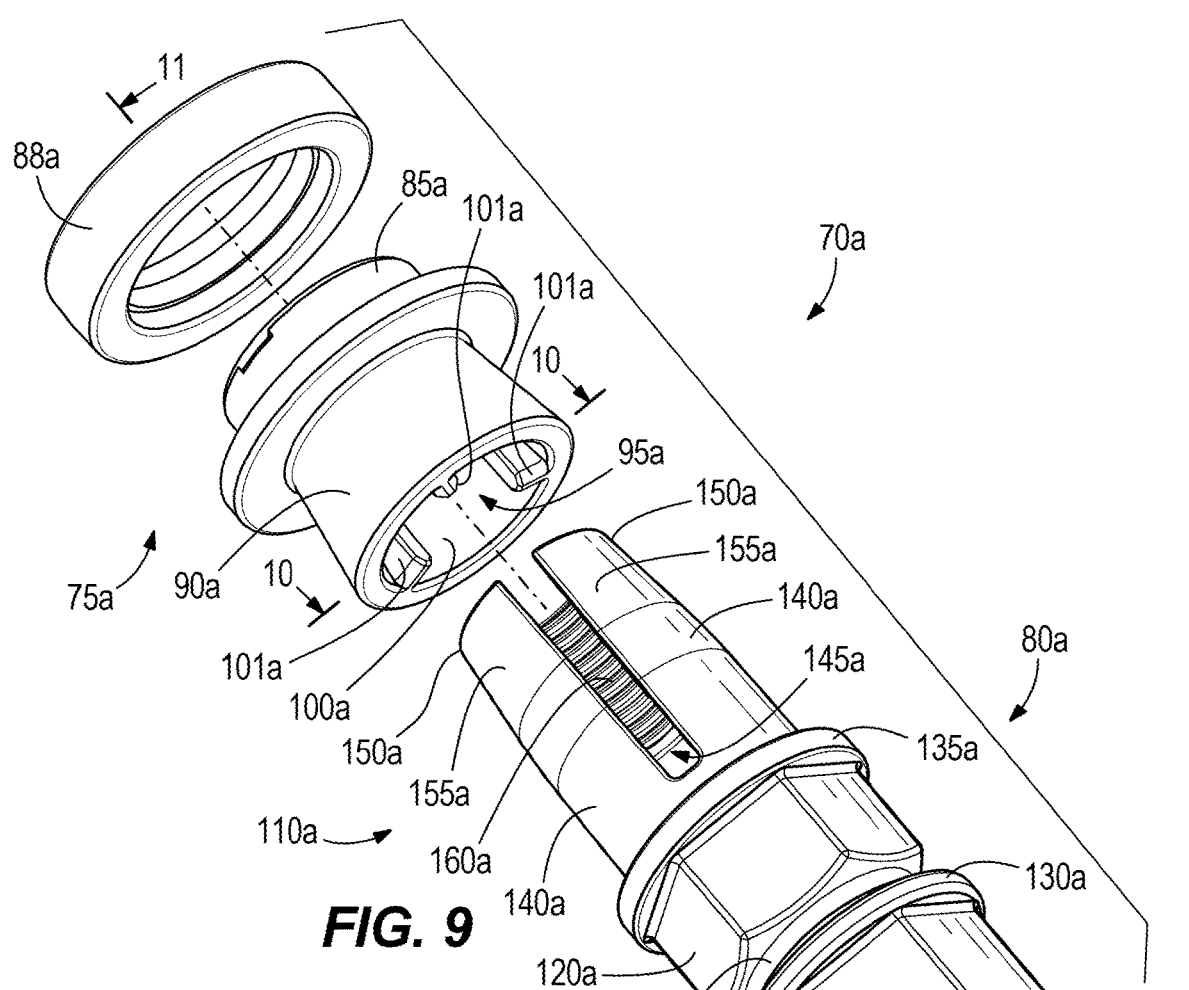
FIG. 9 is an exploded view of a fastening assembly according to another embodiment of the disclosure.
Figure 10:
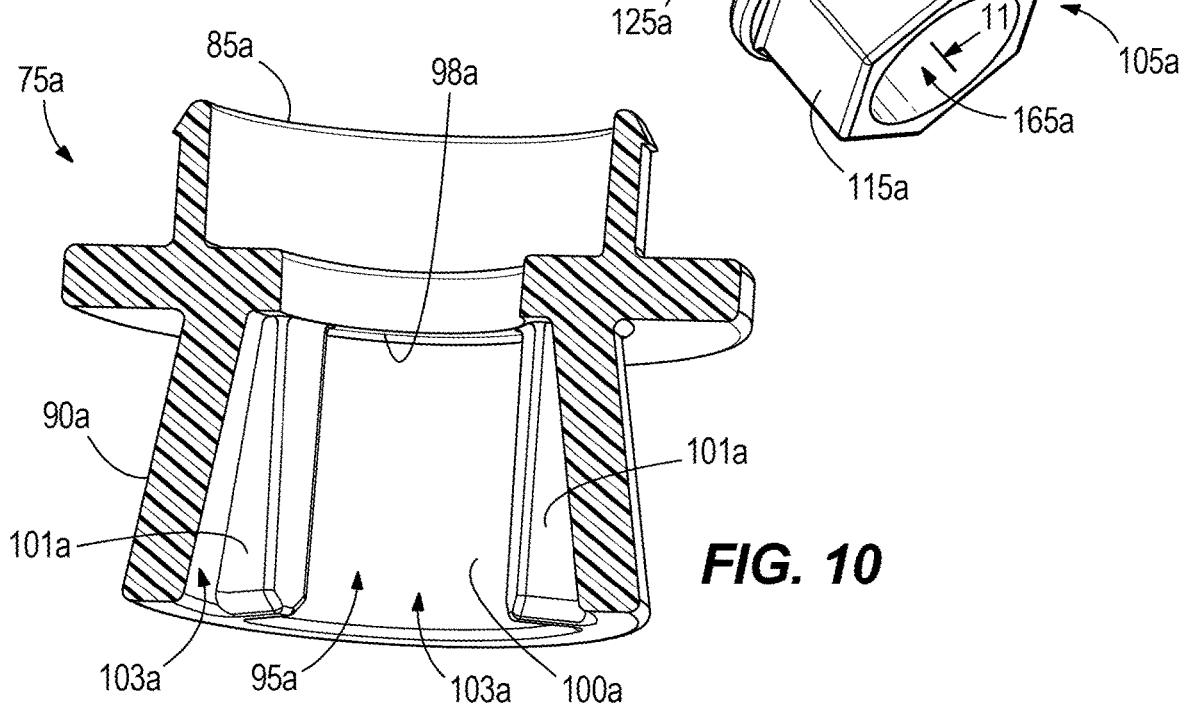
FIG. 10 is a cross sectional view of a sleeve of the fastening assembly of FIG. 9 taken along line 10-10.

The illustrated fastening assembly 70a includes a sleeve 75a and a quick-fastening nut 80a. The sleeve 75a includes a stem 85*a*, a thrust bushing 88*a* coupled to the stem 85*a*, a lower portion 90*a* opposite the stem 85*a*, and a central aperture 95*a* (FIGS. 9 and 10). In particular, the lower portion 90*a* includes an internal stop 98*a* (e.g., internal shoulder), an inner frustoconical-shaped wedge surface 100*a*, and ribs 101*a* extending radially inward from the wedge surface 100*a*. A gap 103*a* is formed between adjacent ribs 101*a*. In the illustrated embodiment, the sleeve 75*a* includes three ribs 101*a* each equally spaced about the wedge surface 100*a* (e.g., about 120 degrees apart). In other embodiments, the sleeve 75*a* can include fewer or more than three ribs 101*a*. Also, in the illustrated embodiment, the ribs 101*a* extend from the internal stop 98*a* toward a bottom surface of the lower portion 90*a*. In other embodiments, the ribs 101*a* can be spaced from the internal stop 98*a* and/or each rib 101*a* can extend along a portion of the wedge surface 100*a*. In addition, an outer surface of the lower portion 90*a* is tapered toward the stem 85*a*.

Figure 11:
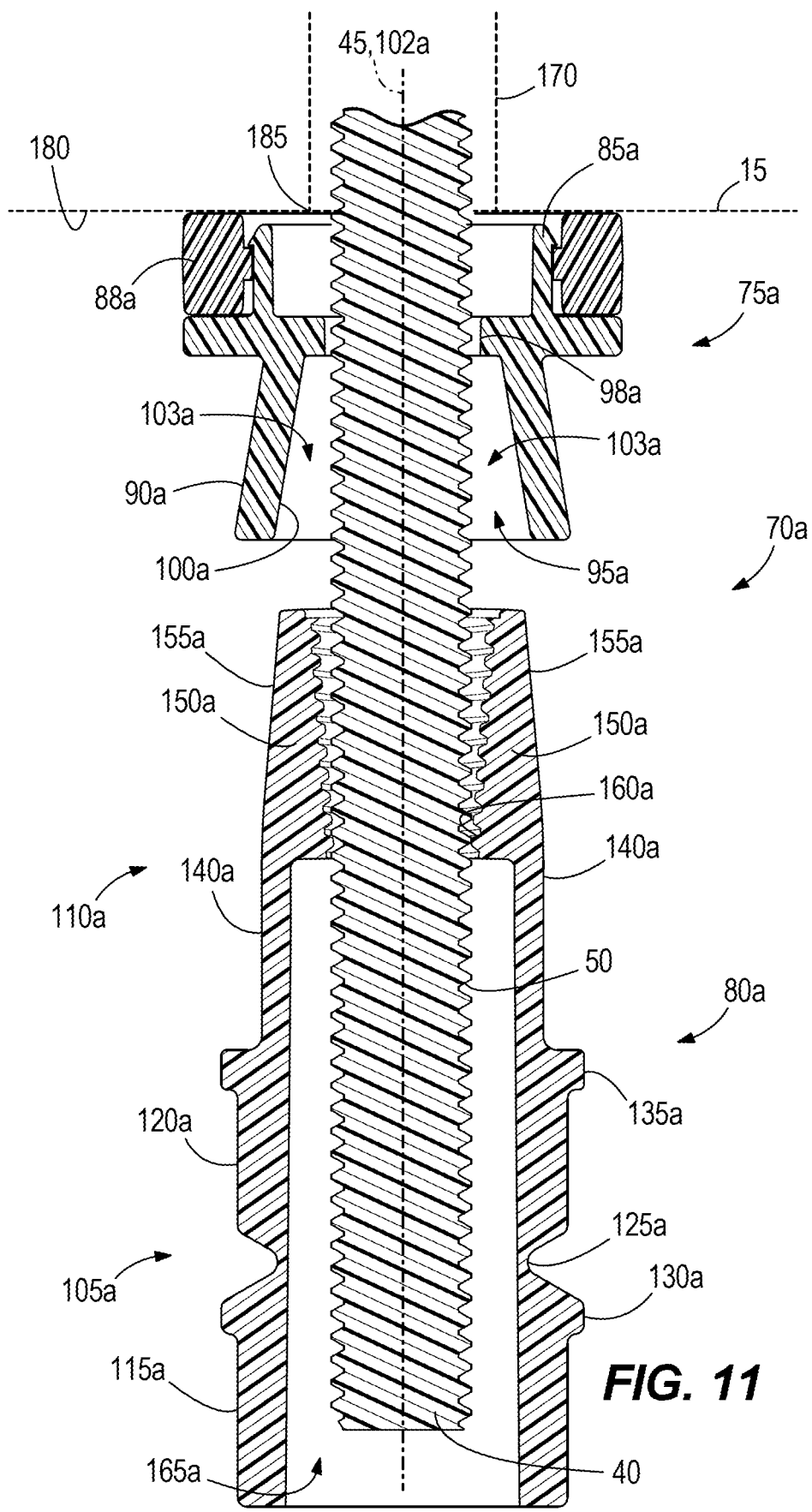
FIG. 11 is a cross sectional view of the fastening assembly of FIG. 9 taken along line 11-11 when the fastening assembly is in an intermediate state of coupling the toilet seat hinge to the toilet bowl.

With reference to FIGS. 9 and 11, the fastening nut 80*a* defines a longitudinal axis 102*a* and includes a drive portion 105*a*, a clamping portion 110*a*, and a central bore 165*a* extending therethrough. The illustrated drive portion 105*a* includes a first segment 115*a*, a second segment 120*a*, and a shear segment 125*a* coupled between the first and second segments 115*a*, 120*a*. The first segment 115*a* includes a first annular ledge 130*a*, and the second segment 120*a* includes a second annular ledge 135*a*. The clamping portion 110*a* includes resilient protrusions 140*a* with adjacent protrusions 140*a* separated by a slot 145*a*. In addition, each protrusion 140*a* includes a head 150*a* having an outer wedge surface 155*a* and inner threads 160*a*. As best shown in FIG. 11, the inner threads 160*a* are tapered toward the drive portion 105*a* when the nut 80*a* is in a default state (e.g., the protrusions 140*a* are spaced from the sleeve 75*a*). In other words, the inner threads 160*a* are oriented at an oblique angle relative to the longitudinal axis 102*a* (FIG. 11).

With reference to FIG. 11, the fastening assembly 70*a* is illustrated in an intermediate state of being assembled to the toilet bowl 15. During assembly, the sleeve 75*a* is slid over the shaft 40 such that the thrust bushing 88*a* abuts the bottom surface 180 of the toilet bowl 15. The fastening nut 80*a* is slid over the shaft 40 toward the sleeve 75*a*. As shown in FIG. 11, a portion of the threads 50, 160*a* are in engagement allowing the nut 80*a* to easily slide along the shaft 40. Such engagement inhibits the nut 80*a* from sliding off the shaft 40 if the nut 80*a* was released during assembly.

With continued movement of the nut 80*a*, the heads 150*a* of the nut 80*a* will be received within the central aperture 95*a* such that each head 150*a* will be positioned within a gap 103*a*. In other words, each rib 101*a* of the sleeve 75*a* is received within a slot 145*a* of the nut 80*a*, and as a result, the nut 80*a* is inhibited from rotating relative to the sleeve 75*a*. With further movement of the nut 80*a*, the outer wedge surfaces 155*a* engage the inner wedge surface 100*a* to bias the heads 150*a* toward the shaft 40 and increase an amount of engagement between the threads 50, 160*a*. In other embodiments, the threads 50, 160*a* can be spaced from each other before the nut 80*a* engages the sleeve 75*a*.

Figure 12:
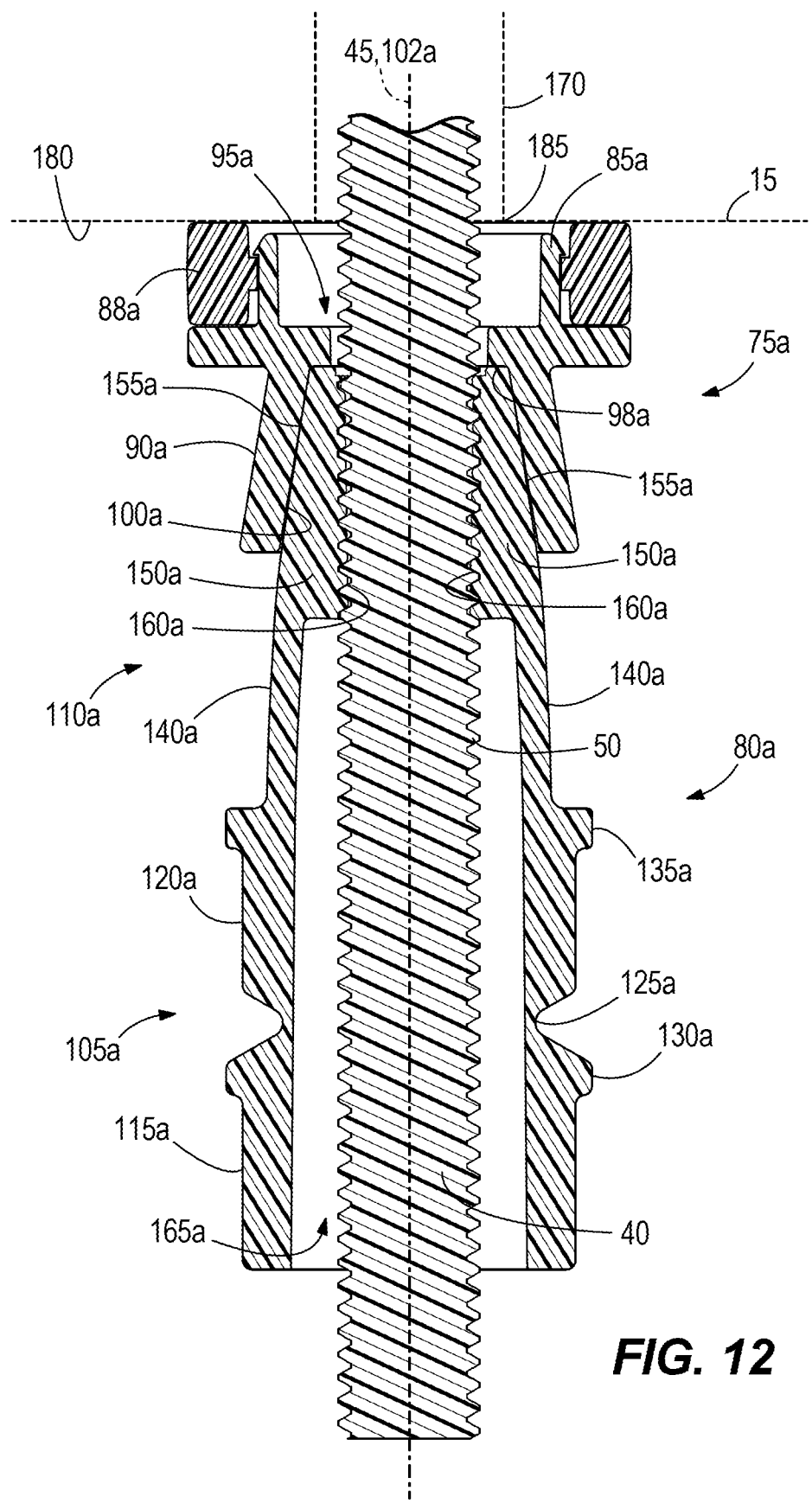
FIG. 12 is a cross sectional view of the fastening assembly of FIG. 9 taken along line 11-11 when the fastening assembly couples the toilet seat hinge to the toilet bowl.

In a point in time, the amount of engagement between the threads 50, 160*a* will prevent the nut 80*a* from being further slid onto the shaft 40. Thereafter, the nut 80*a* and the sleeve 75*a* are rotated together relative to the shaft 40 to further move the nut 80*a* within the sleeve 75*a*. With reference to FIG. 12, the nut 80*a* is rotated until ends of the heads 150*a* engage the internal stop 98*a*. Accordingly, the resilient protrusions 140*a* are wedge between the inner wedge surface 100*a* of the sleeve 75*a* and the shaft 40 at a determined radial clamping force, and the nut 80*a* is inhibited from moving upwardly further into the sleeve 75*a*. In other embodiments, the nut 80*a* and the sleeve 75*a* can engage each other in a different manner to inhibit upward relative axial movement (e.g., engagement between the ribs 101*a* and bottom edges of the slots 145*a*).

With continued rotation of the nut 80*a* and the sleeve 75*a*, an axial clamping force increases between the fastening assembly 70*a*, the toilet bowl 15, and the hinge post 30. In particular, the tool engages the drive portion 105*a* to rotate the first segment 115*a* relative to the second segment 120*a* until the shear segment 125*a* fractures. Accordingly, the toilet seat hinges 20 are fastened to the toilet bowl 15 at the predetermined torque of the shear nuts 80*a*.

FIGS. 13-16 illustrate a fastening assembly 70*b* according to another embodiment. The fastening assembly 70*b* is similar to the fastening assembly 70; therefore, similar components are designated with similar references numbers each identified by an "b." At least some differences and/or at least some similarities between the fastening assemblies 70, 70*b* will be discussed in detail below. In addition, components or features described with respect to only one or some of the embodiments described herein are equally applicable to any other embodiments described herein.

The illustrated fastening assembly 70*b* includes a sleeve 75*b* and a quick-fastening nut 80*b*. The sleeve 75*b* includes a stem 85*b*, a thrust bushing 88*b* coupled to the stem 85*b*, a lower portion 90*b* opposite the stem 85*b*, and a central aperture 95*b* (FIG. 14). The lower portion 90*b* includes an internal stop 98*b*, an inner frustoconical-shaped wedge surface 100*b*, and ribs 101*b* extending radially inward from the wedge surface 100*b*. A gap 103*b* is formed between adjacent ribs 101*b*. In addition, the sleeve 75*b* includes notches 104*b* extending through the internal stop 98*b*, and each notch 104*b* is at least partially positioned within a gap 103*b*. As such, the illustrated sleeve 75*b* includes three notches 104*b*. In other embodiments, the sleeve 75*b* can include fewer or more than three notches 104*b*. Also, each notch 104*b* is in communication with an edge 106*b* (one edge 106*b* is shown in FIG. 14).

Figure 15:
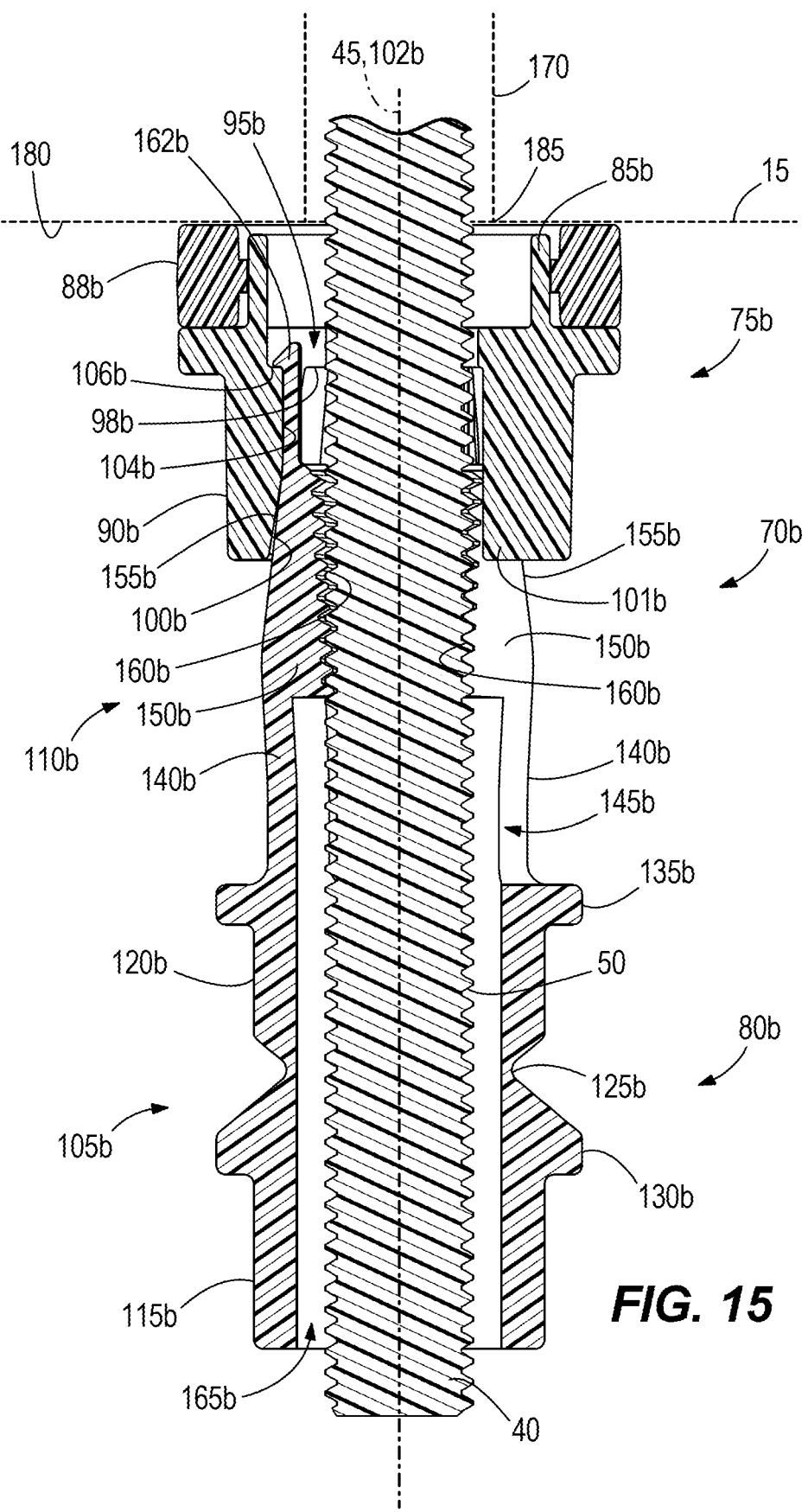
FIG. 15 is a cross sectional view of the fastening assembly of FIG. 13 taken along line 15-15 when the fastening assembly is in an intermediate state of coupling the toilet seat hinge to the toilet bowl.

With reference to FIGS. 13 and 15, the fastening nut 80*b* defines a longitudinal axis 102*b* and includes a drive portion 105*b*, a clamping portion 110*b*, and a central bore 165*b* extending therethrough. The illustrated drive portion 105*b* includes a first segment 115*b*, a second segment 120*b*, and a shear segment 125*b* coupled between the first and second segments 115*b*, 120*b*. The first segment 115*b* includes a first annular ledge 130*b*, and the second segment 120*b* includes a second annular ledge 135*b*. The clamping portion 110*b* includes resilient protrusions 140*b* with adjacent protrusions 140*b* separated by a slot 145*b*. In addition, each protrusion 140*b* includes a head 150*b* having an outer wedge surface 155*b* and inner threads 160*b*. As best shown in FIG. 15, the inner threads 160*b* are oriented at an oblique angle relative to the longitudinal axis 102*b*. In addition, each head 150*b* includes a retainer 162*b* (e.g., a hook) extending from a tip of the head 150*b*. In other embodiments, at least one head 150*b* can include a retainer 162*b*.

In the illustrated embodiment, the nut 80*b* is coupled to the sleeve 75*b* by engagement between the retainers 162*b* and the edges 106*b*. In particular, the heads 150*b* of the nut 80*b* are received within the central aperture 95*b* such that each head 150*b* is positioned within a gap 103*b*. As a result, each rib 101*b* of the sleeve 75*b* is received within a slot 145*b* of the nut 80*b* inhibiting relative rotation between the nut 80*b* and the sleeve 75*b*. In addition, by inserting the heads 150*b* within the gaps 103*b*, alignment of the retainers 162*b* with the notches 104b is provided. The retainers 162b slide within the notches 104b for the retainers 162b to engage the edges 106b. As a result, the nut 80b is inhibited from moving out of the central aperture 95b of the sleeve 75b. In other embodiments, the sleeve 75b can include the retainer(s) 162b, and the nut 80b can include the edge(s) 106b. In further embodiments, the edge(s) 106b and the retainer(s) 162b can be positioned differently on the sleeve 75b and the nut 80b. For example, the retainer(s) 162b can be positioned on an exterior surface of the protrusions 140b and the edge(s) 106b can be positioned on an exterior surface of the lower portion 90b.

With reference to FIG. 15, the assembled nut 80b and sleeve 75b is slid over the shaft 40 such that the thrust bushing 88b abuts the bottom surface 180 of the toilet bowl 15. Engagement between the retainers 162b and the edges 106b position the nut 80b relative to the sleeve 75b such that the inner threads 160b can ride along the exterior threads 50 of the shaft 40 without rotation therebetween. As such, the fastening assembly 70b can be quickly slid onto the shaft 40 to abut the bottom surface 180 of the toilet bowl 15. With continued reference to FIG. 15, at least a portion of the inner threads 160b are in engagement with the exterior threads 50 to inhibit the fastening assembly 70b from sliding off the shaft 40 if released during assembly.

Figure 16:
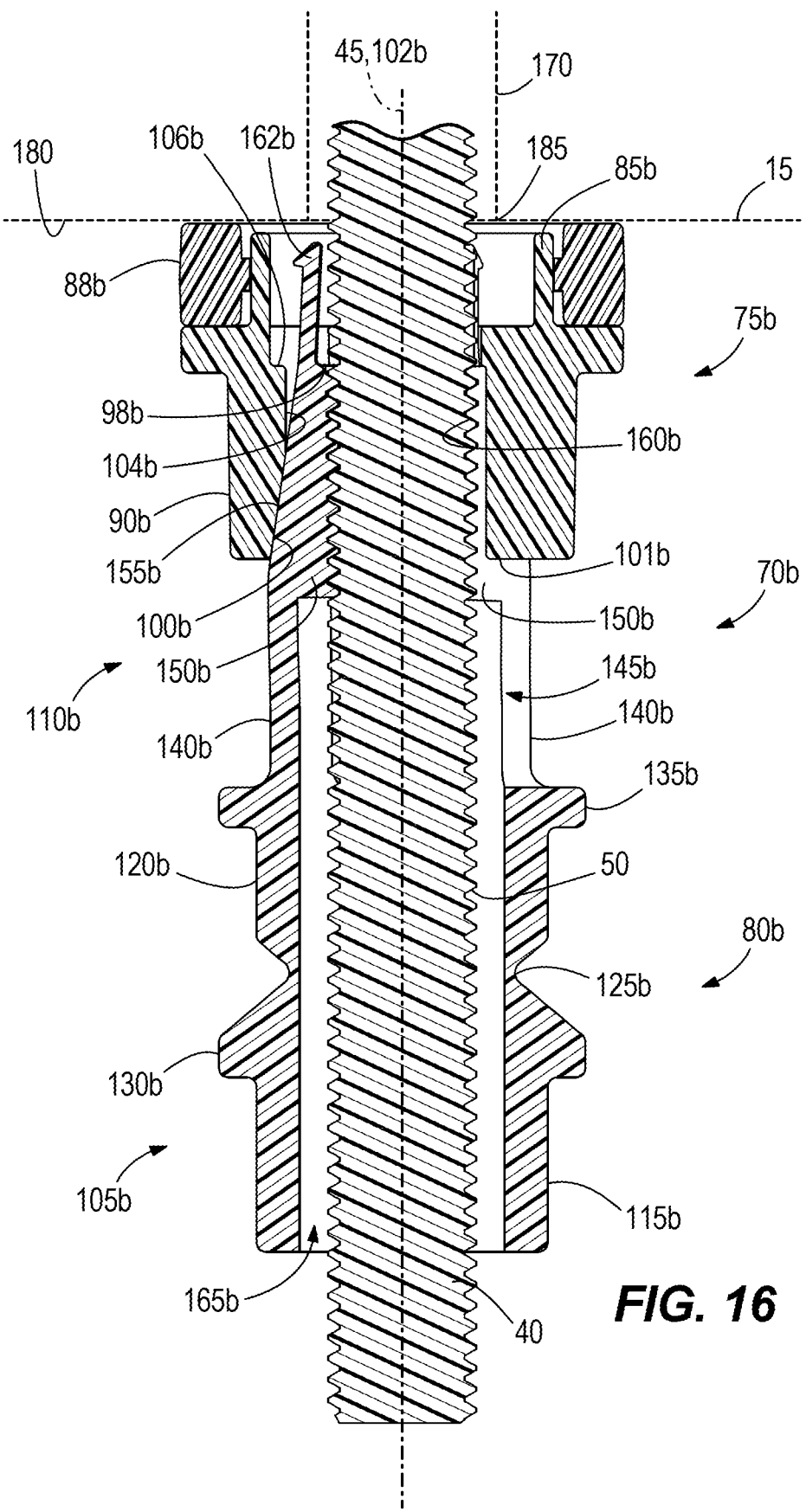
FIG. 16 is a cross sectional view of the fastening assembly of FIG. 13 taken along line 15-15 when the fastening assembly couples the toilet seat hinge to the toilet bowl.

The fastening assembly 70b is rotated relative to the shaft 40 causing the nut 80b to slide further into the sleeve 75b. With reference to FIG. 16, the nut 80b slides within the sleeve 75b until the ends of the heads 150b engage the internal stop 98b. Accordingly, the resilient protrusions 140b are wedged between the inner wedge surface 100b of the sleeve 75b and the shaft 40 at a determined radial clamping force, and the nut 80b is inhibited from moving upwardly further into the sleeve 75b. As also shown in FIG. 16, the retainers 162b are positioned within the stem 85b and are spaced from the edges 106b when the protrusions 140b engage the internal stop 98b.

With continued rotation of the fastening assembly 70b, an axial clamping force increases between the fastening assembly 70b, the toilet bowl 15, and the hinge post 30. In particular, the tool engages the drive portion 105b to rotate the first segment 115b relative to the second segment 120b until the shear segment 125b fractures. Accordingly, the toilet seat hinges 20 are fastened to the toilet bowl 15 at the predetermined torque of the shear nuts 80b.

Although the disclosure has been described in detail with reference to certain preferred embodiments, variations and modifications exist within the scope and spirit of one or more independent aspects of the disclosure as described. Various features and advantages of the disclosure are set forth in the following claims.

The invention claimed is:

1. A fastening assembly configured to couple a toilet seat hinge to a toilet bowl by a threaded shaft, the fastening assembly comprising:
   a sleeve configured to abut a portion of the toilet bowl, the sleeve including
      an inner surface defining an aperture, the aperture configured to receive the threaded shaft; and
   a fastening nut including
      a clamping portion having a resilient protrusion configured to allow axial movement of the fastening nut relative to threads of the threaded shaft without rotation therebetween, the resilient protrusion having an outer surface engageable with the inner surface of the sleeve, the resilient protrusion having threads configured to engage the threaded shaft, and
      a drive portion in which the clamping portion extends therefrom, the drive portion having a first segment coupled to a second segment by a shear segment, at least the first segment configured to be engaged by a tool for the tool to rotate the fastening nut relative to the threaded shaft such that the shear segment fractures at a predetermined torque applied to the first segment relative to the second segment.

2. The fastening assembly of claim 1, wherein the inner surface of the sleeve is a frustoconical inner surface.

3. The fastening assembly of claim 1, wherein the sleeve includes a stop extending from the inner surface, and wherein the resilient protrusion of the fastening nut is engageable with the stop to inhibit axial movement of the fastening nut relative to the sleeve in a direction.

4. The fastening assembly of claim 1, wherein the sleeve includes a rib extending from the inner surface, and wherein the resilient protrusion is engageable with the rib to inhibit rotation of the fastening nut relative to the sleeve and allow axial movement of the fastening nut relative to the sleeve.

5. The fastening assembly of claim 4, wherein the resilient protrusion is one of a plurality of resilient protrusions of the fastening nut, wherein the fastening nut includes a slot formed between adjacent resilient protrusions, and wherein the rib of the sleeve is received within the slot.

6. The fastening assembly of claim 1, wherein the sleeve includes a stem that rotatably supports a bushing, and wherein the bushing is configured to abut the portion of the toilet bowl.

7. The fastening assembly of claim 1, wherein the threads of the resilient protrusion taper toward the drive portion such that a portion of the threads is configured to engage the threaded shaft.

8. The fastening assembly of claim 7, wherein the engagement between the outer surface of the resilient protrusion and the inner surface of the sleeve biases the resilient protrusion radially inwardly such that a greater portion of the threads of the resilient protrusion are configured to engage the threaded shaft.

9. The fastening assembly of claim 1, wherein the fastening nut includes a retainer engageable with the sleeve to allow axial movement of the fastening nut relative to the sleeve and inhibits removal of the fastening nut relative to the sleeve.

10. A fastening assembly configured to couple a toilet seat hinge to a toilet bowl by a threaded shaft, the fastening assembly comprising:
    a fastening nut including
       a clamping portion having a resilient protrusion configured to allow axial movement of the fastening nut relative to threads of the threaded shaft without rotation therebetween, the resilient protrusion having threads configured to engage the threaded shaft, and
       a drive portion in which the clamping portion extends therefrom, the drive portion having a first segment coupled to a second segment by a shear segment, at least the first segment configured to be engaged by a tool for the tool to rotate the fastening nut relative to the threaded shaft such that the shear segment fractures at a predetermined torque applied to the first segment relative to the second segment.

11. The fastening assembly of claim 10, wherein the resilient protrusion is one of a plurality of resilient protrusions of the fastening nut, and wherein the fastening nut includes a slot formed between adjacent resilient protrusions.

12. The fastening assembly of claim 10, wherein the threads of the resilient protrusion taper toward the drive portion such that a portion of the threads is configured to engage the threaded shaft.

13. The fastening assembly of claim 12, wherein the resilient protrusion is configured to be biased toward the threaded shaft such that a greater portion of the threads of the resilient protrusion engage the threaded shaft.

14. The fastening assembly of claim 10, wherein the fastening nut includes a retainer engageable with the sleeve to allow axial movement of the fastening nut relative to the sleeve and inhibits removal of the fastening nut relative to the sleeve.

15. The fastening assembly of claim 10, further comprising a sleeve configured to be positioned between the fastening nut and the toilet bowl, wherein the sleeve includes an inner surface engageable with an outer surface of the resilient protrusion.

16. The fastening assembly of claim 15, wherein the fastening nut is inhibited from rotating relative to the sleeve.

17. A fastening assembly configured to couple a toilet seat hinge to a toilet bowl by a threaded shaft, the fastening assembly comprising:
a sleeve including an inner surface defining an aperture, the aperture configured to receive the threaded shaft such that the sleeve is axially moveable along the threaded shaft to abut a portion of the toilet bowl; and
a fastening nut including a resilient clamping portion and a drive portion, the fastening nut configured to receive the threaded shaft such that the fastening nut is axially moveable along threads of the threaded shaft without rotation between the fastening nut and the threaded shaft, the resilient clamping portion configured to engage the threaded shaft and the inner surface of the sleeve such that rotation of the fastening nut relative to the threaded shaft axially moves the fastening nut relative to the sleeve, the drive portion configured to fracture at a predetermined torque during rotation of the fastening nut relative to the threaded shaft.

18. The fastening assembly of claim 17, wherein a retainer is positioned between the fastening nut and the sleeve to allow axial movement of the fastening nut relative to the sleeve and to inhibit removal of the fastening nut relative to the sleeve.

19. The fastening assembly of claim 17, wherein the fastening nut is inhibited from rotating relative to the sleeve.

20. The fastening assembly of claim 17, wherein the sleeve includes a stem that rotatably supports a bushing, and wherein the bushing is configured to abut the portion of the toilet bowl.

* * * * *